United States Patent [19]

Kousek et al.

[11] Patent Number: 4,723,389

[45] Date of Patent: Feb. 9, 1988

[54] METHOD OF PLACING ANCHOR MEMBERS USING A DOWEL COMPOUND

[75] Inventors: Heinz Kousek, Feldkirch, Austria; Daniel Bindschedler, Nendeln, Liechtenstein

[73] Assignee: Hilti Aktiengesellschaft

[21] Appl. No.: 5,372

[22] Filed: Jan. 12, 1987

Related U.S. Application Data

[63] Continuation of Ser. No. 732,240, May 8, 1985, abandoned.

[30] Foreign Application Priority Data

May 9, 1984 [DE] Fed. Rep. of Germany ....... 3417171

[51] Int. Cl.$^4$ .......................... F16B 13/14; E04B 1/48
[52] U.S. Cl. ...................................... 52/698; 52/744; 405/260
[58] Field of Search ................. 52/798, 741, 743, 744, 52/698; 405/260, 261

[56] References Cited

U.S. PATENT DOCUMENTS

| | | | |
|---|---|---|---|
| 3,251,701 | 5/1966 | Klein | 106/89 |
| 3,303,037 | 2/1967 | Klein | 106/89 |
| 4,498,817 | 2/1985 | Oulsnam | 405/260 |
| 4,537,535 | 8/1985 | MacBain | 405/260 |

FOREIGN PATENT DOCUMENTS

| | | | |
|---|---|---|---|
| 471668 | 1/1973 | Australia | 405/261 |
| 2080469 | 2/1982 | United Kingdom | 52/698 |

OTHER PUBLICATIONS

*Materials of Construction*–Adelbert P. Mills–John Wiley & Sons, Inc. NY–1955.

*Primary Examiner*—J. Karl Bell
*Attorney, Agent, or Firm*—Toren, McGeady & Associates

[57] ABSTRACT

In securing an anchor in a borehole in a receiving material, a settable hydraulic dowel compound is introduced into the borehole either before, during or after the placement of the anchor member. The dowel compound includes an expandable component. The diameters of the borehole and the anchor member are selected so that an annular gap extends around the anchor member with the gap having a maximum area of 200 mm$^2$. The expandable component ensures an increase in the volume of the dowel component above the initial volume in a free expansion procedure.

17 Claims, No Drawings

METHOD OF PLACING ANCHOR MEMBERS USING A DOWEL COMPOUND

This is a continuation of application Ser. No. 732,240, filed May 8, 1985 now abandoned.

BACKGROUND OF THE INVENTION

In the wet or adhesive installation of anchor members, such as tie rods, in boreholes, a liquid settable compound or an adhesive compound having an inorganic and/or organic base is used. The engagement between the tie rod and the solid receiving material containing the borehole is due to the form-locking engagement between the more or less rough borehole wall surface and the injected liquid or pasty grout material, which, after setting, adopts the shape of the borehole or due to the adhesive action of the grout or adhesive compound with the surface of the borehole.

In expansion dowels, the other conventional type of anchoring system, the anchor member is secured predominately due to a friction-type locking which occurs due to the mechanical expansion of elastically deformable component parts.

SUMMARY OF THE INVENTION

Therefore, the primary object of the present invention is to provide an anchor member which combines the features of the two anchoring arrangements mentioned above for achieving optimum extraction values and, thereby, maximum stability of the anchor member.

In accordance with the present invention, in a method of placing anchor members, such as dowels, in tie rods and the like, initially a borehole is formed in a receiving material and the anchor member is placed in the borehole. A hydraulic dowel compound is injected into the borehole either before, during or after the insertion of the anchor member. An expandable hydraulic dowel compound is used and the borehole and the anchoring means are selected so that an annular gap is provided between the anchor member and the borehole with a maximum area of 200 mm$^2$. Surprisingly, in accordance with the present invention, optimum extraction values are attained and maximum anchor stability is assured, since the combination of an adhesive fastening and an expansion dowel-type friction locking are provided. The optimum results achieved are due, to a great extent, to the expandable hydraulic dowel compounds which expand during the setting of the compound used in the present invention.

In carrying out the method of the present invention, a borehole is formed in the receiving material. The expandable hydraulic dowel compound can be injected into the borehole before, during or after the insertion of the anchor member. Preferably, the dowel compound is introduced into the borehole before or during the insertion of the anchor member, that is, the dowel compound can be introduced at the same time that the anchor member is placed into the borehole. A hydraulic dowel compound is one that sets irreversibly within a given period of several minutes to several days, particularly within several hours, after water has been added to the compound. The compound includes among other components those which set or harden under the action of water. Hydraulic dowel compounds, as a rule, are used in a liquid or paste-like form, that is, the compound contains the water required for the hydraulic setting reaction. Expandable components are used which expand when exposed to water. Accordingly, the dowel compound experiences an increase in volume above the volume present during the mixing operation. In accordance with the present invention, generally the expandable hydraulic dowel compound is injected into the borehole while it contains at least the water quantity necessary for hydraulic setting and expanding of the compound, that is, it is in the form of a liquid or paste-like compound.

In addition to the use of expandable hydraulic dowel compounds, the particular suitability and composition of such compounds will be discussed later, in accordance with the present invention the area difference between the cross-sectional area of the borehole and the cross-sectional area of the anchor member must be considered, that is, the area of the annular gap formed between the surface of the borehole and the juxtaposed surface of the anchor member. Preferably the area of the annular gap is set at a maximum of 200 mm$^2$. In establishing this maximum the importance is not so much in the funnels or crater-like shaped parts present near the surface of the receiving material containing the borehole, but rather concerns the values situated and determined in the deeper parts of the borehole which resist withdrawal. Even when certain tolerance limits are provided over the range of area indicated, it has been found that a secure anchor can no longer be ensured when the indicated maximum area is substantially exceeded.

All conventional anchoring members, formed of various materials such as metals, plastics materials and the like, can be used as the anchor member in the present invention, however, metallic anchor members are preferred. The anchor members include, in particular, dowels of all types, metal anchors, especially heavy-duty anchors of various types, tie rods, such as cylindrical and polygonally shaped tie rods along with tie rods with profiled surfaces, that is, where the surface is provided with notches or small protuberances, including threaded tie rods, forked tie rods and especially tie rods where the part inserted into the borehole widens conically toward the leading end.

In accordance with the present invention optimum results are achieved if the anchor member is inserted into the borehole for a length up to ten times, preferably in the range of six to ten times, for instance, eight times, the diameter of the anchor member.

It has proved to be advantageous to utilize a borehole and an anchor member where the annular gap is less than 180 mm$^2$ and is preferably in the range of 100 to 160 mm$^2$ when the anchor member is used in a receiving material having a strength less than that of class B 15 DIN (German Industrial Standard) no. 1045 which has a comprehensive strength of 150 kp/cm$^2$ comparable approximately to a compressive strength of 2,200 psi. Accordingly, it is sufficient in lower strength receiving materials to use smaller area differences of the annular gap in place of the higher area differences which can be used for concrete of the strength characterized for B 15. Such lower area differences are even preferred in lower strengths receiving materials. The annular gap and the diameter of the anchor member can be completely assymetrical as is often the case in practice.

In tie rods where the cross-sectional area is not constant over the length of the rod, for instance, where there are constricted regions, bulges, cones, small protuberances and the like in the region of the rod inserted into a borehole, it has proven to be advantageous to determine the area difference as the mean cross-sectional area of the anchor member or to provide a mean area difference between the area of the borehole and of the anchor member at a maximum of 200 mm². The same situation applies, in a corresponding sense, in undercut boreholes.

Where the anchor member has a polygonal cross-section or where longitudinal grooves are formed in its outside surface, it is advantageous to provide an area difference between the cross-sectional area of the borehole and the enveloping curve or line for the anchor member with a maximum area difference of 200 mm².

It has been found to be advantageous to maintain a distance between the edge of the receiving material and the borehole which is at least ten times the borehole diameter. The distance between the edge and the borehole can be varied depending on the area difference between the cross-sectional area of the borehole and the cross-sectional area of the anchor member. For example, where the area difference is approximately 100 mm², a distance between the edge of the receiving material and the borehole can be approximately five times the borehole diameter while the distance of ten times the diameter is sufficient where the area difference is 200 mm².

Another feature of the invention is the use of a hydraulic dowel compound for securing the anchor member in a recess, such as a borehole or the like, this dowel compound is especially suited for carrying out the above-described method. The hydraulically setting dowel compound, according to the present invention, is characterized, apart from the hydraulic setting components, in that it includes at least one expandable component so that dependent on the type and quantity of the hydraulic setting compound the expansion takes place in a free or unimpeded manner and imparts a greater volume to the compound than the initial volume of the compound, that is, the volume of the compound initially when it is mixed with water.

Expandable, hydraulically setting preparations as such have been known for some time. Generally they are used for producing pretensioned structures, so-called prestressed concrete, or for compensating for shrinkage which often occurs when hydraulic compounds set. Usually, expandable hydraulic setting compounds are made up of cement, such as portland cement or rapid-hardening cement along with an expandable component. Such compounds are described in French patent No. 1 459 132, British patent No. 1 083 727, German patent Nos. 2 23 695 and 23 14 562, U.S. Pat. Nos. 3,155,526, 3,251,701, 3,303,037 and 3,844,710 and, as far as an expandable additive is concerned, in European patent application No. 80 30 3874.4. These texts are mentioned expressly to avoid the listing of the compounds which are usable in accordance with the present invention.

The expandable hydraulic dowel components, in accordance with the present invention, contain as a substantial component a hydraulically setting component along with an expandable component acting on the set compound to increase its volume. These substantial components can be present in different quantities with the hydraulic setting component and the expanding component constituting the greater weight percent of the total compound. The amounts of these components depends on the characteristics required in each instance. Naturally, the volume increase occurs only when a corresponding expansion space is available. If this were not the case, considerable internal pressure would develop in the compound or in the resultant set member, which would immediately use up the possible subsequent, even slight, expansion possibilities in a volume-increasing manner.

As a result, it is to be assumed that the dowel compounds, according to the present invention, contain substances which as expandable components, increase in volume when exposed to water with the expandable component exerting its volume increasing effect after the addition of water. There is the advantage, therefore, that the same medium, that is, water, can be used as in the hydraulic setting process. Accordingly, for practical reasons, it is only by way of exception that volume-increasing expandable substances which expand with the addition of other materials, such as univalent or polyvalent alcohols, are contained as the expandable component in dowel compounds according to the present invention. On the other hand, aqueous organic media, such as water-glycol mixtures, are quite in demand. The hydraulically setting component includes materials which are conventionally used for this purpose, such as cement, particularly portland cement, portland blast furnace cement, alumina cement and the like.

The water to powder ratio for the dry, granular dowel compound, lies generally in the range 0.2 to 0.6, preferably between 0.2 and 0.5 and specifically between 0.25 and 0.35.

The complex interplay between the expansion process and the hydraulic setting process has not yet been scientifically explained. It is assumed that a substantial part of the expansion forces act on a system which to a considerable extent is hydraulically set and, apart from the volume increase, also acts on the considerable inner pretensioning.

Dowel compounds containing CaO as the component causing expansion after the addition of water, are especially preferred. CaO is suitable to a great degree because of its easy accessability and its reliable expansion action. This expansion component is particularly directed to calcined lime, that is, a product produced by calcining or burning calcium carbonate. CaO calcined between 1100° and 1600° C. (medium to hard calcination) is preferred in the dowel compounds.

The expansion force decreases as the calcining temperature of the lime decreases. On the other hand, the reaction is increased as the grinding fineness increases. In addition to the particle size, the pour volume of the CaO also influences the expansion behavior. The pour volume of the CaO used amounts preferably to 5 to 50%, particularly 8 to 30%. Moreover, the expansion characteristic can be influenced through the calcining atmosphere. For example, a reducing combustion atmosphere retards the expansion velocity of lime calcined in this manner.

Even if the expansion component is often present in smaller weight quantities than the hydraulic setting component, and the expansion component may be less than 50 weight percent, particularly in the range of 15 to 30 weight percent with reference to the total weight of the dowel compound, the compound can also contain higher weight portions of the expansion component in dependence on the desired expansion characteristic, for example, in the range of 20–805 weight percent, or of the hydraulic setting component in the range of 10–50 weight percent. Accordingly, the hydraulic dowel compound, in accordance with the present invention, can have the following composition with reference to the total weight:
- 22–85 weight-% CaO
- 12–76 weight-% hydraulic setting component
- 0–2 weight-% additive (expansion retarder, setting accelerator, concrete liquefier, etc.)
- 0–10 weight-% filler material (sand etc.).

Other materials such as MgO, gypsum and/or substantially unsintered material with the components CaO, $Al_2O_3$ and/or $CaSO_4$ be incorporated as components imparting expandability instead of, or in addition to, CaO. MgO and gypsum have a delaying expansion characteristic with comparatively moderate expansion force.

Further, substances influencing the time period for the expansion and the hydraulic setting can be included in the hydraulic dowel compound to control the processes. For example, components can be introduced for retarding expansion or accelerating the hydraulic setting. Examples of expansion retarding substances are potassium fluoride, calcium fluoride, calcium stearate, fatty acid glyceride and/or sugar. Examples of expansion accelerating components are chloride, organic wetting agents, sodium hydroxide, glycols and the like. To accelerate the hydraulic setting process, setting accelerators conventionally employed in hydraulic compounds, such as chloride additions for portland cement and the like, can be utilized.

Finally, the dowel compounds embodying the present invention, can contain conventional additive reagents such as filler material, that is, sand, agents for influencing rheological characteristics such as liquifiers, that is, products with a melamin resin base, agents influencing viscosity, agents imparting thixotropy, wetting agents, pH-value influencing agents, and similar conventional additive agents.

The hydraulic expandable dowel compounds also contain organic settable components particularly reactive unsaturated polyester, polyurethane formation components, epoxy resins and the like. Accordingly, the setting characteristic, for example, can be affected in the sense of the rapid achievement of functional capabilities.

A particular preferred use of the dowel compounds, in accordance with the present invention, involves the fastening or anchoring of metallic tie rods in boreholes.

In carrying out the inventive method with the dowel compounds in accordance with the present invention, the constant maximum pressure is generally reached in the borehole after several hours or several days. In extraction tests for determining the force/distance curve, an almost rectangular characteristic line is achieved. In placement depths of approximately 80 mm, a conical breaking away or a breakage of rods occurs in the extraction text. With placement depths of 110 mm or in tie rods with a conically widened end adjacent the base of the borehole, breakage of rods occurs during the extraction test, even with high strength rods. These results are independent of the presence of drilling dust or oil residue within the borehole. If some changes take place in the borehole, even after a period of time, such as cracking or the like, an immediate post-expansion or filling of the crack, respectively, occurs due to the prestressed character of the dowel compound. Thus, the dowel compound is a kind of chemical force/way-reserve The dowel compounds can be packaged as ready-mixed granular compounds for use with water, in bulk form or as dosed or proportioned units, packed in bags, tubes and like containers of plastics material, paper and the like. Two cartridges of plastics material and/or glass, known per se, with one containing the powder and the other the required mixing water, can be broken up during insertion of the anchor member and are particularly preferred.

EXAMPLE 1

To place a cylindrical tie rod with a diameter of 12 mm, a borehole is drilled to a depth of 100 mm with a 16 mm drill in concrete of strength B25. After the drillings are removed from the borehole, if necessary, an expandable hydraulic dowel compound with a water content of 30 weight percent is injected into the borehole. The required amount of the dowel compound is approximately 15 cm$^3$. The tie rod is then inserted into the borehole so that it is centered.

To provide a centering action, a plastics material ring can be used (with an inside diameter slight more than 12 mm, and an outside diameter less 16 mm) which can, if necessary, be removed after the dowel compound has set. After waiting for a setting period of approximately one-half hour, the dowel can be loaded after another half-hour and these times can be shortened depending on the respective conditions.

EXAMPLE 2

The dowel compound is made up of 50 weight-percent unslaked lime (preferably with a chemical composition according to SIA 215) produced at a calcining temperature of 1350° C. and for a time period of 60 hours with a ground fineness of 1.7 m$^2$/g, 49 weight-percent portland cement (for instance, type HPC according to SIA 215) and 1 weight-percent of a concrete liquefier (that is, having a melamin resin base such as is commercially available under the name Melment F 10). The components of the compound are mixed, that is, agitated in a reagent bottle for a period of 30 seconds to 1 minute with the bottle having a volume of 3–4 times the powder volume of the compound. Next, with reference to the powder quantity, 30 weight-percent water with a temperature of approximately 16° C. with reference to an ambient temperature of 20° C., is added to the compound and it is stirred with a rod for approximately 1 minute so that a homogenous compound results. The compound is immediately filled into the borehole in accordance with Example 1 and the tie rod, as described above, is inserted.

While specific embodiments of the invention have been shown and described in detail to illustrate the application of the inventive principles, it will be understood that the invention may be embodied otherwise without departing from such principles.

We claim:

1. Method of placing anchor members, such as dowels, tie rods and the like, comprising the steps of forming a borehole having an axis in a receiving material, inserting an anchor member into the borehole, introducing a settable hydraulic dowel compound into the borehole at least no later than immediately following the insertion of the anchor into the borehole, wherein the improvement comprises using an expandable hydraulic dowel compound as the hydraulic dowel compound, utilizing the anchor member with a variable cross-sectional area along the length thereof, establishing a mean annular area between the surface of the borehole and the surface of the anchor member with the means annular area being in the range of 100 mm² to 200 mm², forming the borehole with a depth in the range of 6 to 10 times the average diameter of the anchor member, and inserting the anchor member for the depth of the borehole.

2. Method, as set forth in claim 1, wherein forming the borehole with a depth of 8 times the diameter of the anchor member.

3. Method, as set forth in claim 1, wherein the receiving material in which the borehole is formed has a strength of lower than the strength for B 15 concrete, using a borehole diameter and a diameter of the anchor member so that the annular area is less than 180 mm².

4. Method, as set forth in claim 3, wherein the annular area is in the range of 100 to 160 mm².

5. Method, as set forth in claim 1, wherein using a tie rod as the anchor member and providing the tie rod at the end inserted first into the borehole with an axially extending surface conically widening toward the end.

6. Method, as set forth in claim 1, wherein using an anchor member with as polygonally shaped crosssection.

7. Method, as set forth in claim 1, wherein forming the borehole at a distance from an adjacent edge of the receiving material in the range of at least 5 times the borehole diameter with the annular area in the borehole around the anchor member being at least 100 mm² to 10 times the borehole diameter from the adjacent receiving material edge where the annular area in the borehole around the anchor member is a maximum of 200 mm².

8. Method, as set forth in claim 1, wherein the expandable hydraulic dowel compound comprises CaO as an expandable component.

9. Method, as set forth in claim 8, wherein the expandable hydraulic dowel compound includes one of MgO gypsum and substantially unsintered compounds containing CaO, $Al_2O_3$ and $CaSO_4$ for effecting the expansion of the compound.

10. Method, as set forth in claim 8, wherein the CaO in the expandable hydraulic compound is calcined at a temperature in the range of 1100° to 1600° C.

11. Method, as set forth in claim 8, wherein the expandable hydraulic dowel compound includes an expansion delay component.

12. Method, as set forth in claim 8, wherein said expandable hydraulic dowel compound includes a component for effecting rapid setting action of the compound.

13. Method, as set forth in claim 8, wherein the expandable hydraulic dowel compound includes a component for delaying expansion and a component for accelerating the setting action of the compound.

14. Method, as set forth in claim 13, wherein the component for delaying expansion includes one of potassium fluoride, calcium fluoride, calcium stearate, fatty acid glyceride and sugar.

15. Method, as set forth in claim 8, wherein the expandable dowel hydraulic compound includes one of portland cement and alumina cement as the hydraulic setting component.

16. Method, as set forth in claim 8, wherein the expandable hydraulic dowel compound includes
   22-85 weight-% CaO
   12-76 weight-% hydraulic setting compound
   0-2 weight-% additives for at least one of expansion delay, setting acceleration and concrete liquification,
   0-10 weight-% filler material such as sand.

17. Method, as set forth in claim 8, wherein the anchor member is a metallic tie rod.

* * * * *